(12) United States Patent
Jia et al.

(10) Patent No.: US 12,127,156 B2
(45) Date of Patent: Oct. 22, 2024

(54) AREA IDENTIFYING APPARATUS AND METHOD AND COMMUNICATION SYSTEM

(71) Applicant: FUJITSU LIMITED, Kawasaki (JP)

(72) Inventors: Meiyi Jia, Beijing (CN); Yulong Shi, Beijing (CN); Lianhai Wu, Beijing (CN); Hua Zhou, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/280,130

(22) Filed: Feb. 20, 2019

(65) Prior Publication Data

US 2019/0182797 A1 Jun. 13, 2019

Related U.S. Application Data

(63) Continuation of application No. PCT/CN2016/097618, filed on Aug. 31, 2016.

(51) Int. Cl.

| H04W 64/00 | (2009.01) |
| H04W 4/029 | (2018.01) |
| H04W 48/12 | (2009.01) |
| H04W 52/02 | (2009.01) |
| H04W 60/04 | (2009.01) |

(Continued)

(52) U.S. Cl.
CPC ......... *H04W 64/003* (2013.01); *H04W 4/029* (2018.02); *H04W 64/00* (2013.01); *H04W 76/11* (2018.02); *H04W 76/40* (2018.02); *H04W 48/12* (2013.01); *H04W 52/0229* (2013.01); *H04W 60/04* (2013.01)

(58) Field of Classification Search
None
See application file for complete search history.

(56) References Cited

U.S. PATENT DOCUMENTS

| 8,670,375 B2 | 3/2014 | Iwamura et al. | |
| 2001/0049282 A1* | 12/2001 | Ushiki | H04W 68/04 |
| | | | 455/435.2 |
| 2008/0102896 A1 | 5/2008 | Wang et al. | |

(Continued)

FOREIGN PATENT DOCUMENTS

| CN | 101641971 A | 2/2010 |
| CN | 104521305 A | 4/2015 |

(Continued)

OTHER PUBLICATIONS

Deenoo et al., U.S. Appl. No. 62/372,973, filed Aug. 10, 2016 (Year: 2016).*

(Continued)

*Primary Examiner* — Faruk Hamza
*Assistant Examiner* — Cassandra L Decker
(74) *Attorney, Agent, or Firm* — Myers Wolin, LLC

(57) ABSTRACT

An area identifying apparatus and method and a communication system. The area identifying method includes: receiving, by a UE, area identification information used for identifying an area transmitted by a base station; comparing the received area identification information with area identification information currently stored in the UE; and determining whether an area where the UE is located is changed according to a result of comparison. Hence, whether the area where the UE is located is changed or which area the UE is located may be efficiently identified.

4 Claims, 6 Drawing Sheets

(51) Int. Cl.
*H04W 76/11* (2018.01)
*H04W 76/40* (2018.01)

(56) References Cited

U.S. PATENT DOCUMENTS

| | | | | |
|---|---|---|---|---|
| 2009/0122727 | A1* | 5/2009 | Gan | H04W 60/04 370/328 |
| 2009/0274086 | A1 | 11/2009 | Petrovic et al. | |
| 2010/0015969 | A1* | 1/2010 | Lee | H04W 48/12 455/422.1 |
| 2011/0263267 | A1 | 10/2011 | Klatt et al. | |
| 2013/0077515 | A1* | 3/2013 | Jung | H04W 48/20 370/252 |
| 2015/0079990 | A1* | 3/2015 | Yun | H04W 36/0083 455/436 |
| 2015/0103647 | A1* | 4/2015 | Batz | H04W 48/04 370/230 |
| 2015/0163637 | A1* | 6/2015 | Castmo | H04W 4/021 455/456.1 |
| 2015/0208411 | A1 | 7/2015 | Mochizuki et al. | |
| 2017/0265133 | A1* | 9/2017 | Chandramouli | H04W 36/0016 |
| 2017/0280372 | A1* | 9/2017 | Martin | H04W 16/26 |
| 2017/0331670 | A1* | 11/2017 | Parkvall | H04J 11/0059 |
| 2017/0374585 | A1* | 12/2017 | Pradas | H04W 36/0033 |
| 2018/0084486 | A1* | 3/2018 | Pradas | H04W 24/10 |
| 2018/0098295 | A1* | 4/2018 | Reial | H04W 48/08 |
| 2018/0234838 | A1* | 8/2018 | Mildh | H04W 8/22 |
| 2019/0053192 | A1* | 2/2019 | Rune | H04W 8/26 |
| 2019/0141659 | A1* | 5/2019 | Frenger | H04W 76/10 |
| 2019/0159278 | A1* | 5/2019 | Takahashi | H04W 52/0222 |
| 2019/0174571 | A1* | 6/2019 | Deenoo | H04W 76/11 |
| 2019/0223094 | A1* | 7/2019 | Ingale | H04W 48/14 |
| 2019/0387393 | A1* | 12/2019 | Xu | H04W 48/10 |
| 2020/0382906 | A1* | 12/2020 | Wang | H04W 4/029 |

FOREIGN PATENT DOCUMENTS

| | | | | |
|---|---|---|---|---|
| EP | 1799006 A1 * | 6/2007 | | H04W 64/00 |
| JP | 2008-193365 A | 8/2008 | | |
| JP | 2010-506446 A | 2/2010 | | |
| JP | 2010-508761 A | 3/2010 | | |
| JP | 2015056689 A | 3/2015 | | |
| WO | 2010/059813 A1 | 5/2010 | | |
| WO | WO-2013021436 A1 * | 2/2013 | | H04W 60/04 |
| WO | 2015/037820 A1 | 3/2015 | | |

OTHER PUBLICATIONS

Machine translation of WO2013/021436A1 (Year: 2013).*
Machine translation of EP1799006 (Year: 2007).*
International Search Report issued by the State Intellectual Property Office of the P.R. China for corresponding International Patent Application No. PCT/CN2016/097618, mailed on May 25, 2017, with an English translation.
Written Opinion of the International Searching Authority issued by the State Intellectual Property Office of the P.R. China for corresponding International Patent Application No. PCT/CN2016/097618, mailed on May 25, 2017, with an English translation.
Interdigital Communications, "UE Mobility in RAN Controlled State for New Radio Access", Agenda Item: 9.4.3.1, 3GPP TSG-RAN WG2 Meeting #95, R2-165649, Gothenburg, Sweden, Aug. 22-26, 2016.
Notification of Reasons for Refusal issued by the Japan Patent Office for corresponding Japanese Patent Application No. 2019-510292, mailed on Dec. 10, 2019, with an English translation.
CMCC, "Discussion on UE states in NR", Agenda Item: 9.4.3.1, 3GPP TSG-RAN WG2 Meeting #95, R2-165211, Göteborg, Sweden, Aug. 22-26, 2016.
Notice of Reasons for Refusal issued by the Japanese Patent Office issued for corresponding Japanese Patent Application No. 2019-510292, mailed on Jun. 23, 2020, with full English translation attached.
First Notification of Office Action issued by the China National Intellectual Property Administration for corresponding Chinese Patent Application No. 201680088187.2, dated Apr. 23, 2020, with an English translation.
Search Report issued by the China National Intellectual Property Administration for corresponding Chinese Patent Application No. 201680088187.2, dated Apr. 23, 2020, with an English translation.
Nokia et al., "Paging and Mobility in Inactive Mode ", Agenda Item: 10.4.1, 3GPP TSG-RAN WG3 Meeting #93, R3-161868, Gothenburg, Swedwen, Aug. 22-26, 2016.
CATT, "UE Mobility in Inactive State", Agenda Item: 9.4.3.1, 3GPP TSG-RAN WG2 Meeting #95, R2-164806, Gothenburg, Swedwen, Aug. 22-26, 2016.
Notice of Reasons for Refusal issued by the Japan Patent Office for corresponding Japanese Patent Application No. 2019-510292, mailed on Mar. 3, 2020, with an English translation.

* cited by examiner

AREA IDENTIFYING APPARATUS AND METHOD AND COMMUNICATION SYSTEM

CROSS REFERENCE TO RELATED APPLICATIONS

This application is a continuation application of International Application PCT/CN2016/097618 filed on Aug. 31, 2016, the entire contents of which are incorporated herein by reference.

TECHNICAL FIELD

This disclosure relates to the field of communication technologies, and in particular to an area identifying apparatus and method and a communication system.

BACKGROUND

In a long-term evolution (LTE) system or an LTE advanced (LTE-A) system, a user equipment (UE) may be in an idle state or a connected state. The UE in the connected state may perform data transmission at any time, and the UE in the idle state, when there is a demand for data transmission, needs to first establish connection, and then perform data transmission.

In a new radio (NR) system or a fifth generation (5G) system, a radio access network (RAN) control state has been introduced. In such an RAN control state, a UE has lowest signaling overhead, lowest power consumption and lowest resource cost, while the number of UEs may be maximized. And the UE in the RAN control state is able to start data transmission with low delay.

And on the other hand, in the LTE system, a tracking area (TA) may perform position management of the UE, which is denoted by a tracking area identity (TAI). In order to reduce signaling for position update due to change of a position, a method for registering a plurality of TAs is generally used, that is, a plurality of TAs constitute a tracking area list (TAL), the TAL being allocated for a UE, and the UE needing not to execute a TA update procedure when it moves between TALs.

Which TAs are allocated for the UE is determined by a mobile management entity (MME) in a network. When the UE moves to a new TA (that is, the TA is not in the TAL in which the UE is registered), it needs to execute a TA update procedure. And the MME may allocate a new TAL for the UE, the newly-allocated TAL containing some TAs in the original TAL. It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that in an NR system or a 5G system, when a characteristic of the RAN control state is taken into account, existing TAs, cells or transmission reception points (TRPs) are unable to satisfy requirements, and a new concept of an area needs to be introduced. When a UE in the RAN control state is located in an area, in a case where downlink data reach from a serving gateway to an RAN node (such as a base station), the UE will be paged; and furthermore, when the UE in the RAN control state moves in the area, network control of mobility needs not be performed.

Therefore, it is very important to identify whether an area where a UE is located is changed or identify which area the UE is located. However, there is no technical solution till now that is able to efficiently identify whether an area where a UE is located is changed or identify which area the UE is located.

Embodiments of this disclosure provide an area identifying apparatus and method and a communication system. It is expected that whether an area where a UE is located is changed or which area the UE is located may be efficiently identified.

According to a first aspect of the embodiments of this disclosure, there is provided an area identifying method, applicable to a UE, the area identifying method including:

receiving area identification information used for identifying an area transmitted by a base station;

comparing the received area identification information with area identification information currently stored in the UE; and determining whether an area where the UE is located is changed according to a result of comparison.

According to a second aspect of the embodiments of this disclosure, there is provided an area identifying apparatus, configured in a UE, the area identifying apparatus including:

an information receiving unit configured to receive area identification information used for identifying an area transmitted by a base station;

an information comparing unit configured to compare the received area identification information with area identification information currently stored in the UE; and an area determining unit configured to determine whether an area where the UE is located is changed according to a result of comparison.

According to a third aspect of the embodiments of this disclosure, there is provided an area identifying method, applicable to a UE, the area identifying method including:

receiving index information used for descrambling an area signal transmitted by a base station;

descrambling a signal of an area according to the index information; and determining whether the UE is located in the area according to a result of signal descrambling.

According to a fourth aspect of the embodiments of this disclosure, there is provided an area identifying apparatus, configured in a UE, the area identifying apparatus including:

an information receiving unit configured to receive index information used for descrambling an area signal transmitted by a base station;

an area searching unit configured to descramble a signal of an area according to the index information; and an area determining unit configured to determine whether the UE is located in the area according to a result of signal descrambling.

According to a fifth aspect of the embodiments of this disclosure, there is provided a communication system, including:

a UE, configured with the area identifying apparatus as described in the second aspect and/or the area identifying apparatus as described in the fourth aspect; and a base station configured to transmit area identification information used for identifying an area to the UE, and/or, transmit index information used for descrambling an area signal to the UE.

An advantage of the embodiments of this disclosure exists in that the UE receives area identification information used for identifying an area transmitted by a base station, compares the received area identification information with area identification information currently stored in the UE, and determines whether an area where the UE is located is changed according to a result of comparison. Hence, whether an area where UE is located is changed or which area the UE is located may be efficiently identified.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims. Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In this disclosure, a base station may be referred to as an access point, a broadcast transmitter, a transmission reception point (TRP), a node B, or an evolution node B (eNB), etc., and may include some or all functions of them. A term "base station" shall be used in the text, and each base station provides communication coverage for a specific geographical region. And a term "cell" may refer to a base station and/or its coverage area, which is dependent on a context of the term.

In this disclosure, a mobile station or equipment may be referred to as a user equipment (UE). The UE may be fixed or mobile, and may also be referred to as a mobile station, a terminal, an access terminal, a user unit, or a station, etc. The UE may be a cellular phone, a personal digital assistant (PDA), a wireless modem, a wireless communication device, a handhold device, a machine type communication device, a lap-top computer, and a cordless telephone, etc.

In this disclosure, an area may be formed by one or more tracking areas (TAs), or formed by one or more cells, or formed by coverage areas of one or more transmission reception points (TRPs). However, this disclosure is not limited thereto, and particular contents of an area may be determined according to an actual situation.

In this disclosure, an RAN control state of a UE may be an idle state, or a connected state, or a newly-defined state other than the idle state and the connected state.

Embodiment 1

Figure 1:
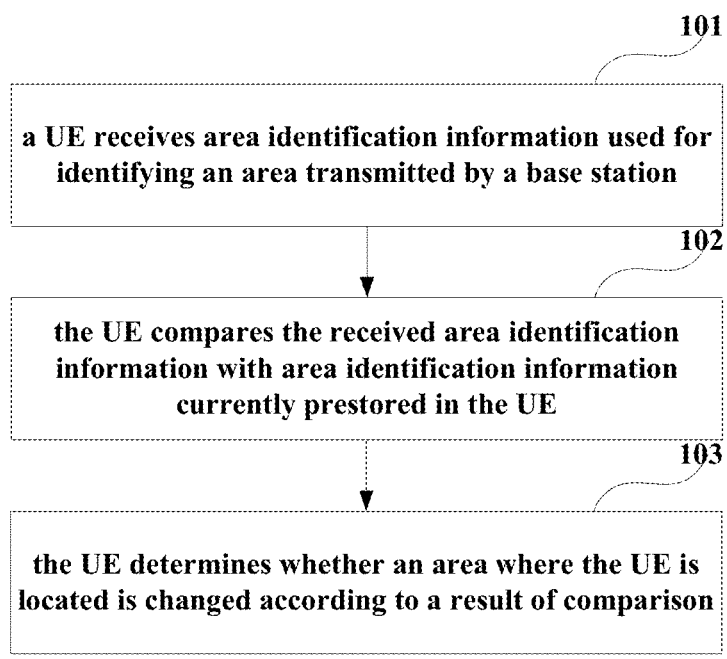
FIG. 1 is a schematic diagram of the area identifying method of Embodiment 1 of this disclosure.

The embodiments of this disclosure provide an area identifying method, applicable to a UE. FIG. 1 is a schematic diagram of the area identifying method of the embodiment of this disclosure, which shall be described from a UE side. As shown in FIG. 1, the area identifying method includes:

Block 101: a UE receives area identification information used for identifying an area transmitted by a base station.

Block 102: the UE compares the received area identification information with area identification information currently stored in the UE; and Block 103: the UE determines whether an area where the UE is located is changed according to a result of comparison.

In an embodiment, the base station may be a macro base station (such as an eNB), and the UE may be served by a macro cell generated by the macro base station; or the base station may also be a pico base station, and the UE may be served by a pico cell or a small cell generated by the pico base station. However, this disclosure is not limited thereto, and a particular scenario may be determined according to an actual situation.

In an embodiment, the UE may be in an RAN control state. The area identification information may be carried in system information (SI), and is transmitted by the base station via a broadcast message. The area identification information is, for example, an identifier uniquely identifying the area. And the area identification information may be configured for each area by a network side by using operation administration and maintenance (OAM) based on network deployment and a definition of a TA.

Following description shall be given by taking that the area identification information is carried in system information as an example.

In an embodiment, the area identification information may include a first identity carried in a master information block (MIB), different first identities correspond with different areas. For example, different first identities correspond with different tracking areas, that is, a first identity in a tracking area is unique.

For example, if the area identification information is not cross TAs, identification information of the area, the first identity, is only needed to be carried in the MIB. And if the area identification information is cross TAs, other parts of the area identification information may be included in other system information, that is, the area identification information may further include a second identity carried in the other system information.

In an embodiment, the MIB may further include indication information, the indication information being used to indicate whether there exists a part of the area identification information that is contained in system information other than the MIB (such as SIB2). For example, 1 bit may be used to indicate whether there exists a second identity, that is, the bit being "1" indicates that there exists a second identity, and the bit being "0" indicates that there exists no second identity; or the bit being "0" indicates that there exists a second identity, and the bit being "1" indicates that there exists no second identity. However, this disclosure is not limited thereto, and other expression manners may also be used.

Figure 2:
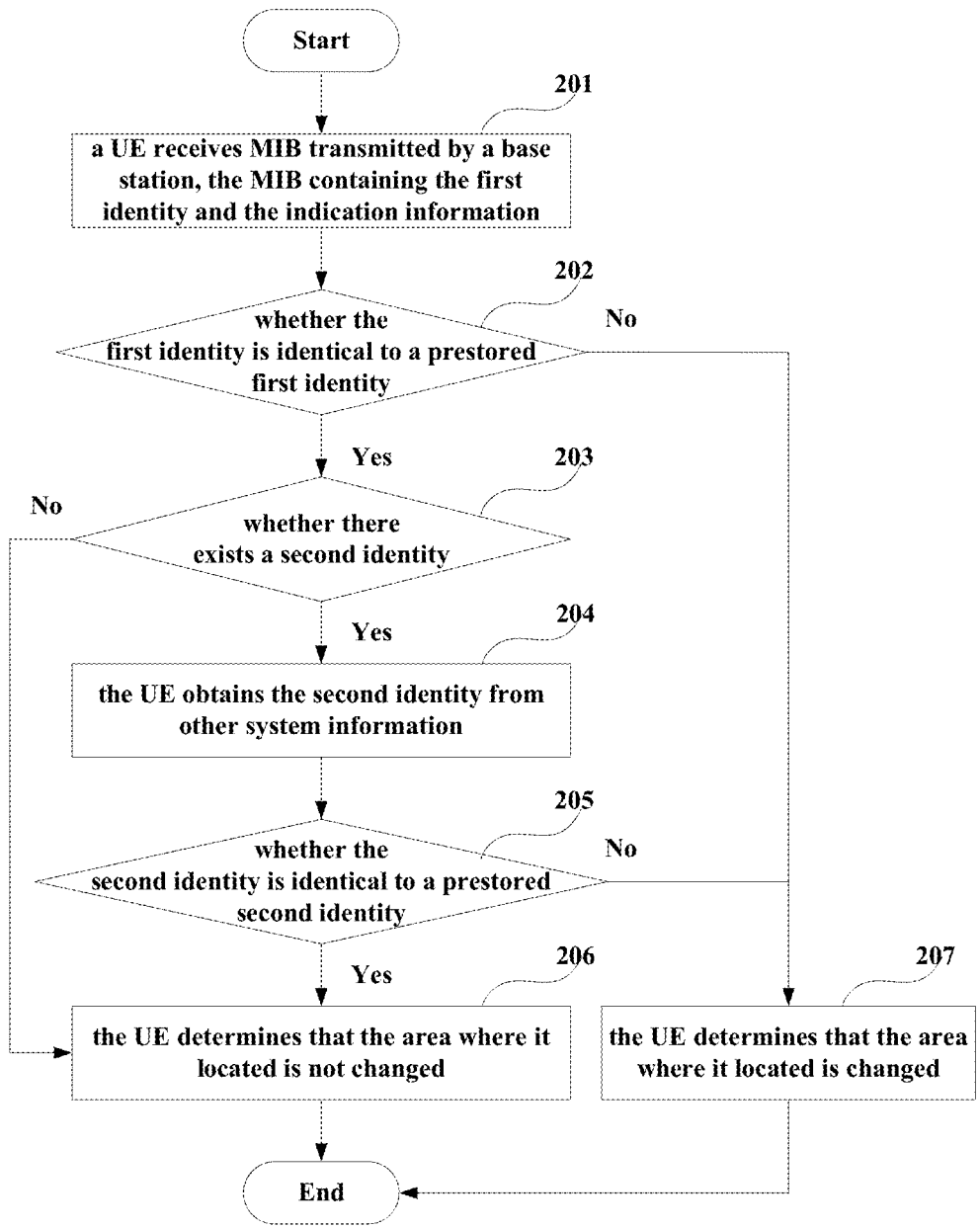
FIG. 2 is another schematic diagram of the area identifying method of Embodiment 1 of this disclosure.

FIG. 2 is another schematic diagram of the area identifying method of the embodiment of this disclosure, which shall be described from a UE side. As shown in FIG. 2, the area identifying method includes:

Block 201: a UE receives MIB transmitted by a base station, the MIB containing a first identity and indication information.

Block 202: the UE compares the first identity with a currently stored first identity, executing block 203 if they are identical, and executing block 207 if they are different.

Block 203: the UE determines whether there exists a second identity according to the indication information, executing block 204 if there exists a second identity, and executing block 206 if there exists no second identity.

Block 204: the UE obtains the second identity from other system information.

Block 205: the UE compares the second identity with a currently stored second identity, executing block 206 if they are identical, and executing block 207 if they are different.

Block 206: the UE determines that the area where it is located is not changed.

In an embodiment, if the area where the UE is located is not changed, the UE may further restart a validity timer.

Block 207: the UE determines that the area where it is located is changed.

In an embodiment, if the area where the UE is located is changed, the UE may further initiate an area update procedure, and update the currently stored area identification information.

Reference may be made to related technologies for details, which shall not be described herein any further.

It should be noted that FIG. 2 only schematically explains the embodiment of this disclosure; however, this disclosure is not limited thereto. For example, an order of execution of the blocks may be appropriately adjusted; and furthermore, some other blocks may be added, or some of these blocks may be reduced.

For example, in FIG. 2, the received first identity is compared with the stored first identity, and then whether there exists a second identity is determined; it may also be that whether there exists a second identity is determined first, and then the received first identity is compared with the stored first identity. That is, a performing order of block 202 and block 203 in FIG. 2 may be adjusted, etc. And appropriate modifications may be made by those skilled in the art according to what is described above, without being limited to those contained in the above figure.

It can be seen from the above embodiment that the UE receives area identification information used for identifying an area transmitted by a base station, compares the received area identification information with area identification information currently stored in the UE, and determines whether an area where the UE is located is changed according to a result of comparison. Hence, whether an area where UE is located is changed may be efficiently identified.

Embodiment 2

The embodiments of this disclosure provide an area identifying apparatus, configured in a UE, with contents in these embodiments identical to those in Embodiment 1 being not going to be described herein any further.

Figure 3:
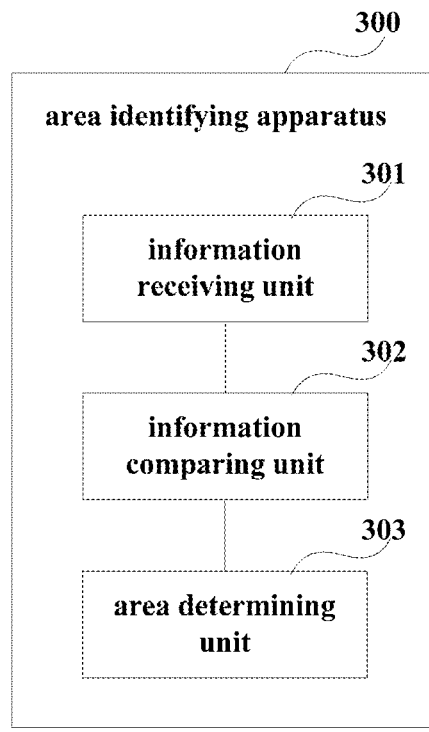
FIG. 3 is a schematic diagram of the area identifying apparatus of Embodiment 2 of this disclosure.

FIG. 3 is a schematic diagram of the area identifying apparatus of the embodiment of this disclosure. As shown in FIG. 3, an area identifying apparatus 300 includes:

an information receiving unit 301 configured to receive area identification information used for identifying an area transmitted by a base station;

an information comparing unit 302 configured to compare the received area identification information with area identification information currently stored in the UE; and an area determining unit 303 configured to determine whether an area where the UE is located is changed according to a result of comparison.

In an embodiment, the UE may be in an RAN control state, the RAN control state being an idle state, or a connected state, or a state other than the idle state and the connected state. The area identification information may be carried in system information, and may be transmitted by the base station via a broadcast message; however, this disclosure is not limited thereto.

In an embodiment, the area identification information may include a first identity carried in a master information block, different first identities correspond with different areas. The master information block may further include indication information, the indication information being used to indicate whether there exists a part of the area identification information that is contained in system information other than the master information block. And the area identification information may further include a second identity carried in the other system information.

In an embodiment, the information receiving unit 302 may be configured to receive a master information block containing the first identity and the indication information; the information comparing unit 302 may be configured to compare the first identity in the master information block with a currently stored first identity when the indication information indicates that there exists no part of the area identification information that is contained in the other system information; and the area determining unit 303 may be configured to determine that the area where the UE is located is not changed when results of comparison are identical.

In an embodiment, the information receiving unit 301 may be configured to receive the master information block containing the first identity and the indication information, and receive the other system information containing the second identity; the information comparing unit 302 may compare the first identity in the master information block with the currently stored first identity, and compare the second identity in the other system information with a currently stored second identity, when the indication information indicates that there exists a part of the area identification information that is contained in the other system information; and the area determining unit 303 may be configured to determine that the area where the UE is located is not changed when two results of comparison are identical.

It can be seen from the above embodiment that the UE receives area identification information used for identifying an area transmitted by a base station, compares the received area identification information with area identification information currently stored in the UE, and determines whether an area where the UE is located is changed according to a result of comparison. Hence, whether an area where UE is located is changed may be efficiently identified.

Embodiment 3

Figure 4:
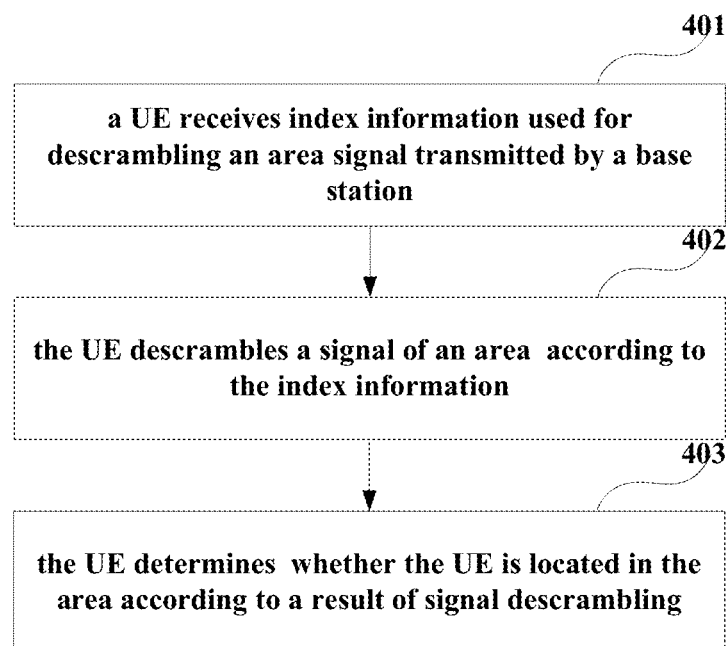
FIG. 4 is a schematic diagram of the area identifying method of Embodiment 3 of this disclosure.

The embodiments of this disclosure provide an area identifying method, applicable to a UE. FIG. 4 is a schematic diagram of the area identifying method of the embodiment of this disclosure, which shall be described from a UE side. As shown in FIG. 4, the area identifying method includes:

Block 401: a UE receives index information used for descrambling an area signal transmitted by a base station.

Block 402: the UE descrambles a signal of an area according to the index information; and Block 403: the UE determines whether the UE is located in the area according to a result of signal descrambling.

In an embodiment, the base station may be a macro base station (such as an eNB), and the UE may be served by a macro cell generated by the macro base station; or the base station may also be a pico base station, and the UE may be served by a pico cell or a small cell generated by the pico base station. However, this disclosure is not limited thereto, and a particular scenario may be determined according to an actual situation.

In an embodiment, when descrambling the signal of the area based on the index information succeeds, it may be determined that the index information corresponds with the area, that is, the UE is located in the area; and when descrambling the signal of the area based on the index information does not succeed, it may be determined that the index information does not correspond with the area, that is, the UE is not located in the area.

In an embodiment, the area signal may be, for example, a synchronization signal of the area, and the index information may be, for example, an index similar to a physical cell identity (PCI). The index information is related to an area, and may successfully scramble a signal of the corresponding area. The index information may be configured by a network side for each area by using OAM based on network deployment and a definition of a TA. However, this disclosure is not limited thereto; for example, other signals may also be used, and furthermore, a particular form of the index information is not limited in this disclosure.

In an embodiment, the UE may further update the index information, and find a corresponding area according to the updated index information.

Figure 5:
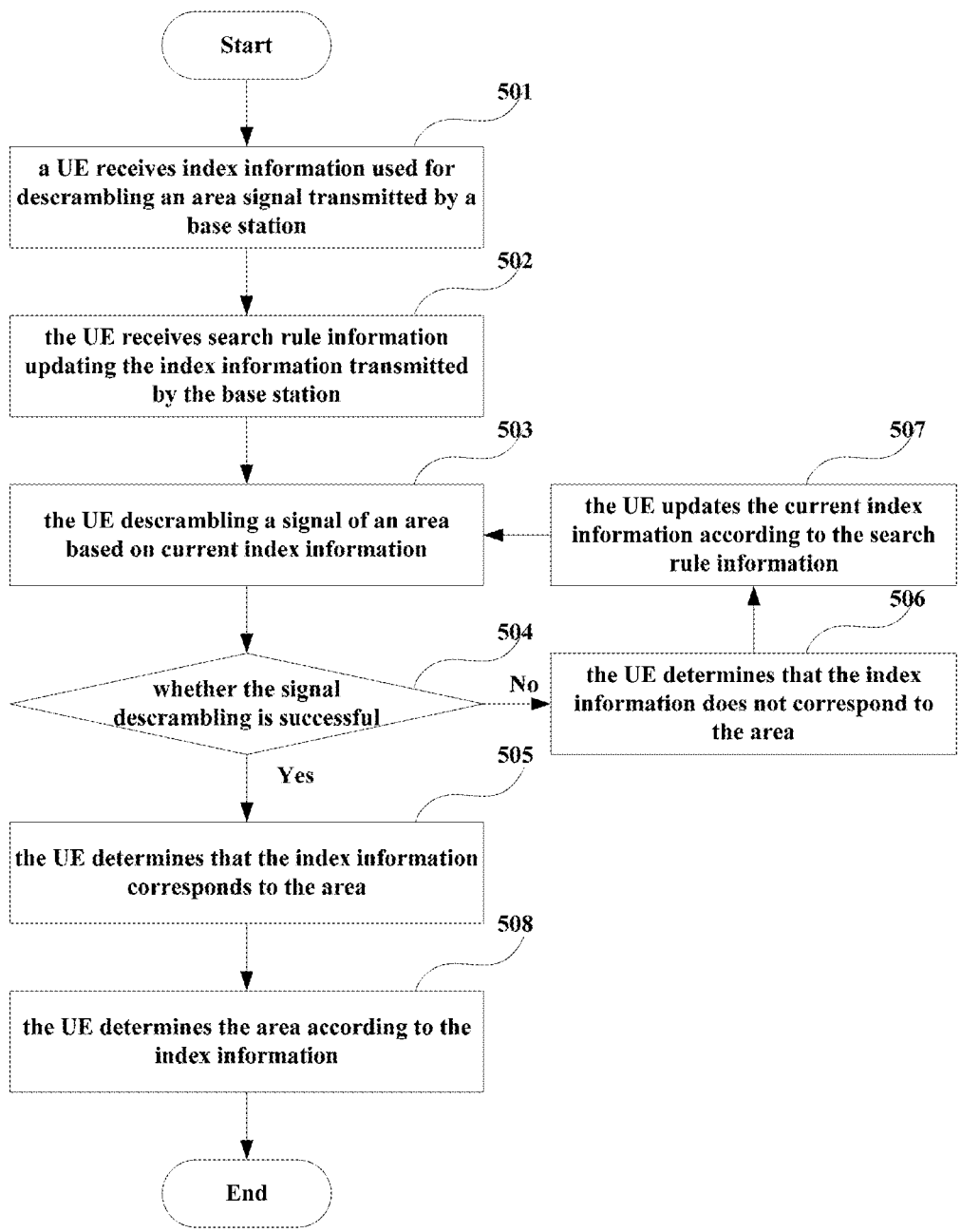
FIG. 5 is another schematic diagram of the area identifying method of Embodiment 3 of this disclosure.

FIG. 5 is another schematic diagram of the area identifying method of the embodiment of this disclosure, which shall be described from a UE side. As shown in FIG. 5, the area identifying method includes:

Block 501: a UE receives index information used for descrambling an area signal transmitted by a base station.

In an embodiment, the index information may be transmitted by the base station via a broadcast message; or the index information may be transmitted by the base station via a specific message when the UE is in a connected state; however, this disclosure is not limited thereto, and a particular transmission manner may be determined according to an actual scenario; and after obtaining the index information, the UE may store the index information.

Block 502: the UE receives search rule information updating the index information transmitted by the base station.

In an embodiment, the search rule information may be transmitted by the base station via a broadcast message; or the search rule information may be transmitted by the base station via a specific message when the UE is in a connected state; however, this disclosure is not limited thereto, and a particular transmission manner may be determined according to an actual scenario; and after obtaining the search rule information, the UE may store the search rule information.

Block 503: the UE descrambling a signal of an area based on current index information.

Block 504: the UE determines whether the signal descrambling is successful, executing block 505 if yes, and executing block 506 if no.

In an embodiment, for example, the UE descrambles the synchronization signal of the area based on the current index information when the UE is in an RAN control state.

Block 505: the UE determines that the index information corresponds with the area.

Block 506: the UE determines that the index information does not correspond with the area.

Block 507: the UE updates the current index information according to the search rule information.

In an embodiment, the search rule information may be, for example, shifted leftwards by one bit, and the UE may update the current index information into index 2 by shifting the current index information (such as index 1) leftwards by one bit; and the UE may store the updated index information as the current index information;

after updating the index information, the UE may continue to execute block 503, and descramble the signal of the area based on the updated index information.

Block 508: the UE determines the area according to the index information. For example, if the current index information is index 1 and scrambling the signal of the area based on index 1 is successful, it may be determined that the area is an area to which index 1 corresponds (such as area 1).

In an embodiment, if the area where the UE is located is not changed, the UE may further restart a validity timer. And if the area where the UE is located is changed, the UE may further initiate an area update procedure. Reference may be made to related technologies for details, which shall not be described herein any further.

It should be noted that FIG. 5 only schematically explains the embodiment of this disclosure; however, this disclosure is not limited thereto. For example, an order of execution of the blocks may be appropriately adjusted; and furthermore, some other blocks may be added, or some of these blocks may be reduced.

It can be seen from the above embodiment that the UE receives index information transmitted by a base station, descrambles a signal of an area based on the index information, and determines whether the UE is located in the area according to a result of signal descrambling.

Hence, which area the UE is located may be efficiently identified.

Embodiment 4

The embodiments of this disclosure provide an area identifying apparatus, configured in a UE, with contents in these embodiments identical to those in Embodiment 3 being not going to be described herein any further.

Figure 6:
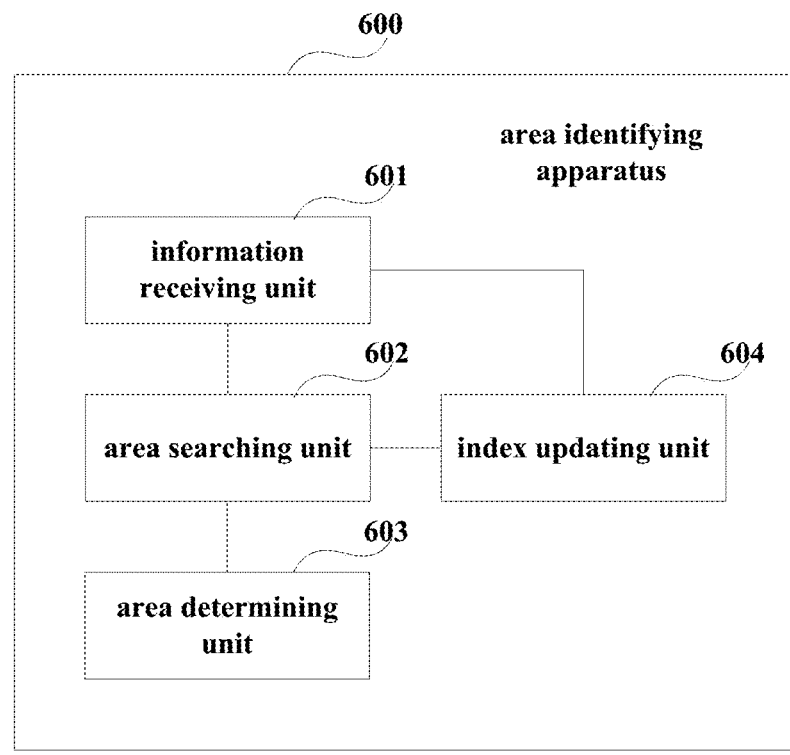
FIG. 6 is a schematic diagram of the area identifying apparatus of Embodiment 4 of this disclosure.

FIG. 6 is a schematic diagram of the area identifying apparatus of the embodiment of this disclosure. As shown in FIG. 6, an area identifying apparatus 600 includes:

an information receiving unit 601 configured to receive index information used for descrambling an area signal transmitted by a base station;

an area searching unit 602 configured to descramble a signal of an area according to the index information; and an area determining unit 603 configured to determine whether the UE is located in the area according to a result of signal descrambling.

In an embodiment, the area determining unit 603 is configured to determine that the UE is located in the area when the area searching unit 602 succeeds in descrambling the signal of the area based on the index information; and the area determining unit 603 is configured to determine that the UE is not located in the area when the area searching unit 603 does not succeed in descrambling the signal of the area based on the index information.

In an embodiment, the information receiving unit 601 may be further configured to receive search rule information updating the index information transmitted by the base station.

As shown in FIG. 6, the area identifying apparatus 600 may further include:

an index updating unit 604 configured to update current index information according to the search rule information;

and the area searching unit 602 may be further configured to descramble the signal of the area based on the updated index information.

In an embodiment, when the area searching unit 602 succeeds in descrambling the signal of the area based on the index information, the area determining unit 603 may further be configured to determine the area according to the index information.

In an embodiment, the index information and/or the search rule information may be transmitted by the base station via a broadcast message; or the index information and/or the search rule information may be transmitted by the base station via a specific message when the UE is in a connected state; however, this disclosure is not limited thereto, and a particular transmission manner may be determined according to an actual scenario In an embodiment, the area searching unit 602 may scramble/descramble the signal of the area based on the index information when the UE is in an RAN control state.

It can be seen from the above embodiment that the UE receives index information transmitted by a base station, descrambles a signal of an area based on the index information, and determines whether the UE is located in the area according to a result of signal descrambling. Hence, which area the UE is located may be efficiently identified.

Embodiment 5

The embodiments of this disclosure provide a communication system, with contents identical to those in embodiments 1-4 being not going to be described herein any further.

Figure 7:
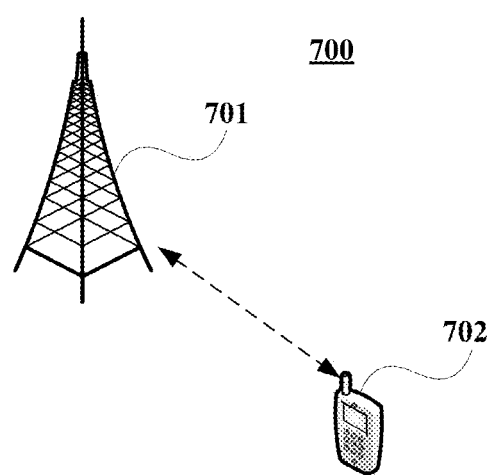
FIG. 7 is a schematic diagram of the communication system of Embodiment 5 of this disclosure.

FIG. 7 is a schematic diagram of the communication system of the embodiment of this disclosure. As shown in FIG. 7, the communication system 700 may include a base station 701 and a UE 702.

The UE 702 may be configured with the area identifying apparatus 300 as described in Embodiment 2, and the base station 701 may be configured to transmit area identification information used for identifying an area to the UE 702; and/or, the UE 702 may be configured with the area identifying apparatus 600 as described in Embodiment 4, and the base station 701 may be configured to transmit index information used for descrambling an area signal to the UE 702.

The embodiment of this disclosure further provides a UE, configured with the area identifying apparatus 300 as described in Embodiment 2 and/or the area identifying apparatus 600 as described in Embodiment 4.

Figure 8:
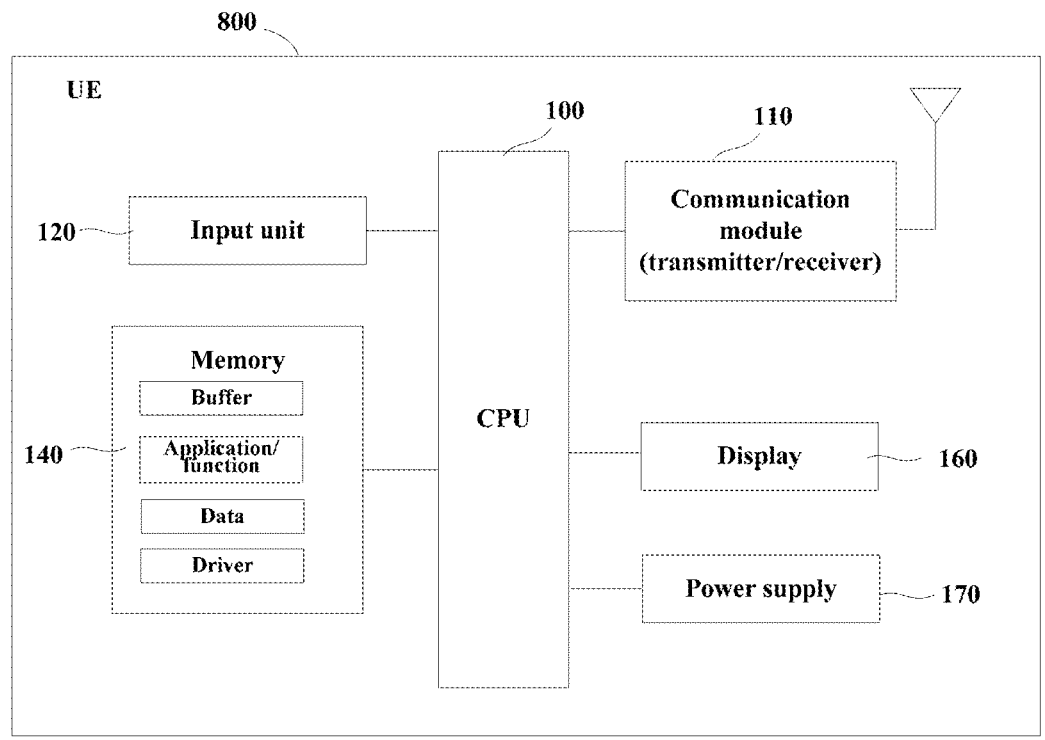
FIG. 8 is a schematic diagram of the UE of Embodiment 5 of this disclosure.

FIG. 8 is a schematic diagram of the UE of the embodiment of this disclosure. As shown in FIG. 8, a UE 800 may include a central processing unit 100 and a memory 140, the memory 140 being coupled to the central processing unit 100. It should be noted that this figure is illustrative only, and other types of structures may also be used, so as to supplement or replace this structure and achieve a telecommunications function or other functions. The central processing unit 100 may be configured to carry out the area identifying method described in Embodiment 1 and/or Embodiment 3.

For example, the central processing unit 100 may be configured to perform following control: receiving area identification information used for identifying an area transmitted by a base station; comparing the received area identification information with area identification information currently stored in the UE; and determining whether an area where the UE is located is changed according to a result of comparison;

and/or, receiving index information used for descrambling an area signal transmitted by a base station; descrambling a signal of an area based on the index information; and determining whether the UE is located in the area according to a result of signal descrambling.

As shown in FIG. 8, the UE 800 may further include a communication module 110, an input unit 120, a display 160 and a power supply 170. Functions of the above components are similar to those in the relevant art, and shall not be described herein any further. It should be noted that the UE 800 does not necessarily include all the parts shown in FIG. 8, and the above components are not necessary; and furthermore, the UE 800 may include parts not shown in FIG. 8, and the relevant art may be referred to.

The embodiment of this disclosure further provides a base station.

Figure 9:
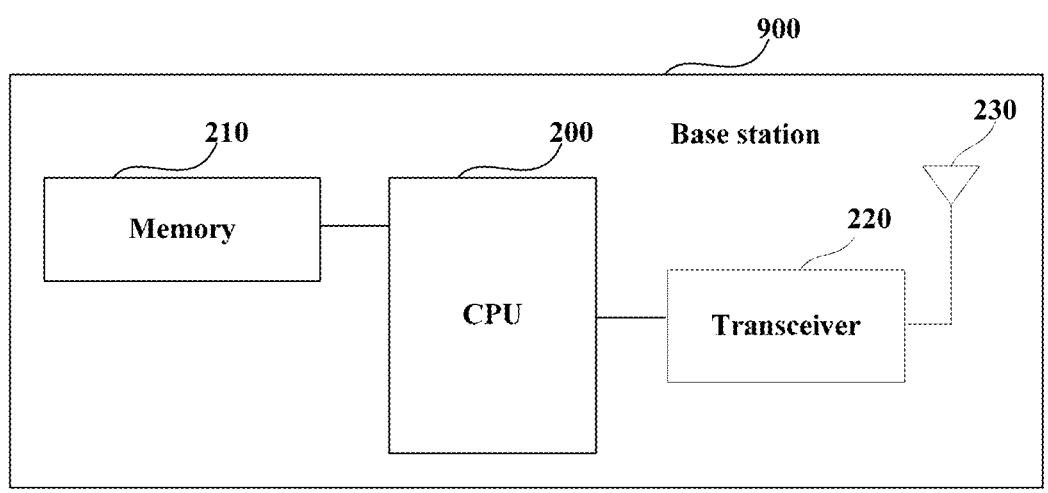
FIG. 9 is a schematic diagram of the base station of Embodiment 5 of this disclosure.

FIG. 9 is a schematic diagram of a structure of the base station of the embodiment of this disclosure. As shown in FIG. 9, a base station 900 may include a central processing unit (CPU) 200 and a memory 210, the memory 210 being coupled to the central processing unit 200. The memory 210 may store various data, and furthermore, it may store a program for information processing, and execute the program under control of the central processing unit 200.

For example, the central processing unit 200 may be configured to perform following control: transmitting area identification information used for identifying an area to a UE, and/or transmitting index information used for descrambling an area signal to the UE.

Furthermore, as shown in FIG. 9, the base station 900 may include a transceiver 220, and an antenna 230, etc. Functions of the above components are similar to those in the relevant art, and shall not be described herein any further. It should be noted that the base station 900 does not necessarily include all the parts shown in FIG. 9, and furthermore, the base station 900 may include parts not shown in FIG. 9, and the relevant art may be referred to.

An embodiment of the present disclosure provides a computer readable program, which, when executed in an area identifying apparatus or a UE, will cause the area identifying apparatus or the UE to carry out the area identifying method as described in Embodiment 1 and/or Embodiment 3.

An embodiment of the present disclosure provides a computer storage medium, including a computer readable program, which will cause an area identifying apparatus or a UE to carry out the area identifying method as described in Embodiment 1 and/or Embodiment 3

The above apparatuses of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or blocks as described above. The present disclosure also relates to a storage medium for storing the above program, such as a hard disk, a floppy disk, a CD, a DVD, and a flash memory.

The method/apparatus described with reference to the embodiments of this disclosure may be directly embodied as hardware, software modules executed by a processor, or a combination thereof. For example, one or more functional block diagrams and/or one or more combinations of the functional block diagrams shown in FIG. 3 may either correspond to software modules of procedures of a computer program, or correspond to hardware modules. Such software modules may respectively correspond to the steps shown in FIG. 1. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the accompanying drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the accompanying drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

Supplement 1. An area identifying apparatus, configured in a user equipment (UE), the area identifying apparatus comprising:

a receiver configured to receive index information used for descrambling a signal of a radio access network (RAN) area of a tracking area (TA) transmitted by a base station, when the UE is in a radio access network control state other than an idle state and a connected state;

a processor coupled to the receiver and configured to descramble the signal of the RAN area of a TA based on the index information; and determine whether the UE is located in the area according to a result of signal descrambling.

Supplement 2. The area identifying apparatus according to supplement 1, wherein the area is formed by one or more cells.

Supplement 3. The area identifying apparatus according to supplement 1, wherein the processor is further configured to determine that the UE is located in the area when the area searching unit succeeds in descrambling the signal of the RAN area of a TA based on the index information, and determine that the UE is not located in the area when the area searching unit does not succeed in descrambling the signal of the RAN area of a TA based on the index information.

Supplement 4. The area identifying apparatus according to supplement 1, wherein the receiver receives search rule information updating the index information transmitted by the base station.

Supplement 5. The area identifying apparatus according to supplement 4, wherein the processor is further configured to:

update current index information according to the search rule information; and descramble the signal of the RAN area of a TA based on the updated index information.

Supplement 6. The area identifying apparatus according to supplement 1, wherein when the processor succeeds in descrambling the signal of the RAN area of a TA based on the index information, the processor is further configured to determine the area according to the index information.

Supplement 7. The area identifying apparatus according to supplement 4, wherein the index information and/or the search rule information are/is transmitted by the base station via a broadcast message.

Supplement 8. The area identifying apparatus according to supplement 4, wherein the index information and/or the search rule information are/is transmitted by the base station via a specific message when the UE is in a connected state.

Supplement 9. The area identifying apparatus according to supplement 1, wherein the processor is further configured to descramble the signal of the RAN area of a TA based on the index information when the UE is in a radio access network control state.

What is claimed is:

1. An area identifying apparatus, configured in a user equipment (UE), the area identifying apparatus comprising:

a receiver configured to receive, when the UE is in a radio access network (RAN) control state, RAN area identification information contained in system information transmitted by a base station via a broadcast message, the RAN area identification information indicating a RAN area of a tracking area, and including a first identity and a second identity, wherein the RAN control state of the UE is a state, which is a state other than an idle state or a connected state; and processor circuitry coupled to the receiver and configured to:

when the UE is in the state, which is the state other than the idle state or the connected state, compare the first identity of the received RAN area identification information with a stored first identity of RAN area identification information currently stored in the UE, and wherein if the first identity and currently stored first identity are identical, the UE compares the second identity of the received RAN area identification information with a stored second identity of RAN area identification information currently stored in the UE, wherein the UE can move within the RAN area without notifying the base station based on the RAN area identification information currently stored in the UE, wherein the RAN area identification information currently stored in the UE is configured by the base station based on a list of tracking areas configured for the UE from a core network, and wherein the first identity identifies the tracking area, and wherein the second identity identifies the RAN area of the tracking area.

2. The area identifying apparatus according to claim 1, wherein the processor circuitry is further configured to determine whether or not the UE performs a RAN update process according to a result of the comparison.

3. An area identifying apparatus, configured in a base station, the area identifying apparatus comprising:

a memory that stores a plurality of instructions; and processor circuitry coupled to the memory and configured to execute the instructions to transmit when a User Equipment (UE) is in a radio access network (RAN) control state, RAN area identification information in system information via a broadcast message, the RAN area identification information indicating a RAN area of a tracking area, and including a first identity and a second identity, wherein the RAN control state of the UE is a state, which is a state other than an idle state or a connected state, wherein when the UE is in the state, which is the state other than the idle state or the connected state, the UE compares the first identity of the received RAN area identification information with a stored first identity of RAN area identification information currently stored in the UE, and wherein if the first identity and currently stored first identity are identical, the UE compares the second identity of the received RAN area identification information with a stored second identity of RAN area identification information currently stored in the UE, wherein the UE can move within the RAN area without notifying the base station based on the RAN area identification information currently stored in the UE, wherein the RAN area identification information currently stored in the UE is configured by the base station based on a list of tracking areas configured for the UE from a core network, wherein the first identity identifies the tracking area, and wherein the second identity identifies the RAN area of the tracking area.

4. A communication system, comprising:

a base station; and a User Equipment (UE), the base station configured to transmit, when the UE is in a radio access network (RAN) control state, RAN area identification information in system information via a broadcast message, the RAN area identification information indicating a RAN area of a tracking area, and including a first identity and a second identity, and the UE configured to:

receive, when the UE is in a RAN control state, the RAN area identification information contained in the system information transmitted by the base station via the broadcast message, the RAN area identification information indicating a RAN area of a tracking area, and including the first identity and the second identity, wherein the RAN control state of the UE is a state, which is a state other than an idle state or a connected state; and when the UE is in the state, which is the state other than the idle state or the connected state, compare the first identity of the received RAN area identification information with a stored first identity of RAN area identification information currently stored in the UE, and wherein if the first identity and currently stored first identity are identical, the UE compares the second identity of the received RAN area identification information with a stored second identity of RAN area identification information currently stored in the UE, wherein the UE can move within the RAN area without notifying the base station based on the RAN area identification information currently stored in the UE, wherein the RAN area identification information currently stored in the UE is configured by the base station based on a list of tracking areas configured for the UE from a core network, wherein the first identity identifies the tracking area, and wherein the second identity identifies the RAN area of the tracking area.

* * * * *